United States Patent Office 3,573,956
Patented Apr. 6, 1971

3,573,956
OPTICAL BRIGHTENING OF POLY-ACRYLONITRILE FIBERS
Heinrich Hausermann, Riehen, and Eduard Troxler, Basel, Switzerland, assignors to Geigy Chemical Corporation, Ardsley, N.Y.
No Drawing. Original application July 23, 1968, Ser. No. 746,746, now Patent No. 3,518,266, dated June 30, 1970. Divided and this application Aug. 25, 1969, Ser. No. 870,847
Int. Cl. C09k 1/02; D06l 3/12
U.S. Cl. 117—33.5                    7 Claims

ABSTRACT OF THE DISCLOSURE

Methods of optically brightening polyacrylonitrile fibers by applying from about 0.001 to about 0.5% calculated on the weight of the fibers quaternary 3-aryl-7-[triazinyl-(2)-amino]-coumarin salts in which the carbon atom in 4-position in the triazinyl nucleus is substituted by a lower alkyl group, an optionally substituted lower alkoxy or lower alkylthio group, or an unsubstituted or organically substituted amino group, and the carbon atom in 6-position in the triazinyl nucleus is substituted by the grouping

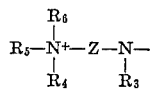

wherein
Z represents an alkylene or oxa-alkylene bridge;
$R_3$ represents hydrogen or a lower alkyl or alkenyl group;
$R_4$, $R_5$ and $R_6$ represent certain organic substituents or
$R_4$ and $R_5$ together with the nitrogen atom represent certain heterocyclic radicals, or the grouping

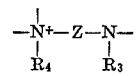

may represent a piperazinium radical, and which novel coumari are useful for protecting foodstuffs.

---

This application is a division of application No. 746,746, filed July 23, 1968, now Pat. No. 3,518, 266, issued June 30, 1970.

This invention relates to new, water-soluble quaternary triazinylamino-coumarin salts and process for their production, to methods for the control of Penicillium growth on foodstuffs and the like substrates, to fungistatic compositions useful for such purpose, to methods for the optical brightening of acrylic substrates with the novel compounds, as well as to substrates protected or brightened therewith.

In a first aspect this invention provides new water-soluble coumarin derivatives of the formula

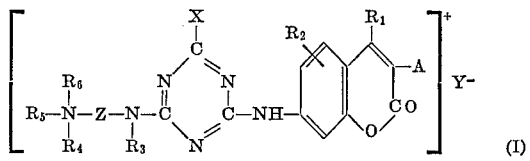

wherein
A represents an optionally non-chromogenically and non-ionically substituted phenyl radical,
$R_1$ and $R_2$ independently of each other, each represent hydrogen or a lower alkyl group,
$R_3$ represents hydrogen or an optionally substituted lower alkyl or lower alkenyl group;
$R_4$ represents an optionally substituted lower alkyl or lower alkenyl group, a cycloalkyl or aralkyl radical,
Or $R_3$ and $R_4$ together form an alkylene group of preferably from 2 to 3 carbon atoms,
Each of $R_5$ and $R_6$ independently of the other represents optionally substituted lower alkyl or lower alkenyl group, a cycloalkyl or aralkyl radical,
Or $R_4$ and $R_6$ taken together with the nitrogen atom to which they are linked represent a non-aromatic heterocycle radical which optionally includes an oxygen atom as ring member, all remaining ring members being preferably methylene groups;
X represents a lower alkyl group, an optionally substituted lower alkoxy or alkylthio group, or an amino radical of the formula

wherein $R_7$ represents hydrogen or an optionally substituted lower alkyl or lower alkenyl group, and
$R_8$ represents hydrogen, an optionally non-ionically and non-chromogenically substituted alkyl or phenyl radical, or lower alkenyl or
$R_7$ and $R_8$ together with the nitrogen to which they are linked, optionally with the inclusion of an oxygen atom as ring member, form a non-aromatic heterocycle,
Z represent an alkylene or oxa-alkylene radical, and
$Y^-$ represents the anion of a strong acid not having dyestuff character, i.e. the anion of an acid having at 18° C. a degree of dissociation of about 20% or higher and not imparting color to the coumarin derivatives of Formula I.

Suitable as substituents of the alkyl groups $R_3$, $R_4$ $R_5$, $R_6$, $R_7$ and $R_8$ as well as of the alkoxy and alkylthio groups represented by X are the hydroxyl or a lower alkoxy group or halogen. Other substituents of alkyl groups $R_4$, $R_5$ and $R_6$ can be the cyano group, the carbamoyl or an alkoxy-carbonyl or hydroxy-alkoxy group.

In preferred compounds falling under Formula I:
A represents a phenyl radical any substituent of which is selected from lower alkyl, lower alkoxy and halogen of an atomic number of at most 35,
Each of $R_1$ and $R_2$ represents hydrogen or lower alkyl,
$R_3$ represents hydrogen, lower alkyl or hydroxy-lower alkyl,
Each of $R_4$, $R_5$ and $R_6$ represents, independently
(a) Alkyl of from 1 to 6 carbon atoms, e.g. methyl, ethyl, n-propyl, isopropyl, n-butyl, isobutyl or hexyl; or
(b) A substituted lower alkyl radical any substituent of which is selected from lower alkoxy, carbamoyl, cyano, lower alkoxy-carbonyl, hydroxy-lower alkoxy, or a phenyl radical any substituent of which is selected from lower alkyl and halogen of an atomic number of at most 35; e.g. 2-hydroxy-ethyl or 2-hydroxy- or 3-hydroxy-propyl; 2-methylethyl, 2-ethoxyethyl, 3-methoxypropyl; benzyl, methylbenzyl or chlorobenzyl; or
((c) Cycloalkyl, especially cyclohexyl or methylcyclohexyl; or

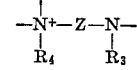

represents a trivalent piperazinium residue

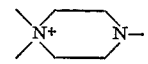

Or $R_4$ and $R_5$ taken together with the nitrogen atom to which they are linked represent pyrrolidino, piperidino, morpholino, hexahydroazepino, or lower alkyl morpholino;

X represents lower alkyl, lower alkoxy, lower alkylthio, or a grouping

wherein each of $R_7'$ and $R_8'$ represents hydrogen, alkyl of at most 6 carbon atoms, hydroxy-lower alkyl, hydroxy-lower alkoxy-lower alkyl, cyano-lower alkyl, carbamoyl-lower alkyl, cyclohexyl, lower-alkyl cyclohexyl, lower alkenyl, or a phenyl amino radical any substituent of which is selected from lower alkyl, lower alkoxy and halogen of an atomic number of at most 35, or $R_7'$ and $R_8'$ together with the nitrogen atom to which they are linked represent pyrrolidino, piperidino, hexahydroazepino, morpholino or lower alkyl-morpholino, Z represents divalents ethylene or propylene, and $Y^-$ represents the anion of an acid having at 18° C. a degree of dissociation of about 20% or higher, and not imparting to the compounds of Formula I color, or to Penicillium growth-inhibiting amounts of said compounds toxicity to warm-blooded animals.

In the most-preferred compounds of Formula I

A represents an unsubstituted phenyl radical, each of $R_1$ and $R_2$ represents hydrogen, $R_3$ represents hydrogen, lower alkyl or hydroxy-lower alkyl, $R_4$ represents lower alkyl, or

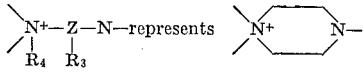

Each of $R_5$ and $R_6$ represents lower alkyl, hydroxyalkyl of from 2 to 3 carbon atoms, alkoxyalkyl of a total of from 3 to 5 carbon atoms, cyano-lower alkyl, lower alkoxy-carbonyl-lower alkyl, or carbamoyl-alkyl of a total of from 3 to 5 carbon atoms, or $R_4$ and $R_5$ taken together with the nitrogen atom to which they are linked represent pyrrolidino, piperidino, morpholino, hexahydroazepino or 2-mono- or 2,6-dimethyl-morpholino, X represents the same groupings as in the above-described preferred dyestuffs, but more preferably the groupings $NH_2$, —NH—lower alkyl, —N(lower alkyl)$_2$, —NH(hydroxyalkyl) wherein alkyl has from 2 to 3 carbon atoms, —NH— (alkoxyalkyl) having a total of from 3 to 5 carbon atoms, —N(hydroxyalkyl)$_2$ wherein alkyl has from 2 to 3 carbon atoms, —NH—(hydroxyalkoxyalkyl) of from 3 to 5 carbon atoms,

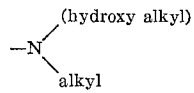

wherein hydroxyalkyl has from 2 to 3, carbon atoms and alkyl from 1 to 2 carbon atoms

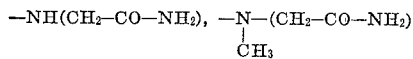

cyclohexylamino, methyl-cyclohexylamino, phenylamino, methylphenylamino, chlorophenylamino, methoxyphenylamino, pyrrolidino, piperidino, morpholino or 2-methyl- or 2,6-dimethyl-morpholino;

Z represents the ethylene or the 1,3-propylene group; and $Y^-$ represents one equivalent of a chlorine or bromine anion, or a preferably lower, alkylsulfate or arylsulfonate anion, e.g. the methosulfate or the p-toluene sulfonate anion, or a zinc-trihalide anion.

The term "lower" when used in this specification and the appended claims in connection with an aliphatic radical means that such radical has not more than 4, and preferably not more than 2 carbon atoms.

The new quaternary compounds form yellowish, water-soluble powders, the diluted aqueous solutions of which have a vivid blue fluorescence in daylight.

They are useful, due to their specific growth-inhibiting action on Penicillum strains, their very low toxicity to warm-blooded animals, and their lack of smell, for the control of such fungal growth on foodstuffs, e.g. preserves, such as marmalade, strawberry jam and the like, cheese of the type on which Penicillium growth is undesirable, e.g. Swiss cheese, Edam cheese and the like, as well as on fruits.

Therefore, the invention provides, in another aspect, Penicillium growth-inhibiting and food preserving agents containing a compound according to the invention as active ingredient, and a method of inhibiting the growth of Penicillium strains, particularly on foodstuffs, by applying to the surface of the food an effective amount of a compound according to the invention.

The new quaternary salts are particularly valuable as active substances in preserving agents which are used, e.g. for citrus fruits such as grapefruit, oranges, lemons, also bananas, pineapple, avocados, mango, guajava, litchi, nut kernels, apples, pears, peaches, apricots, plums, grapes, strawberries, guava, sweet potatoes, potatoes, yams, carrots, turnips, sugar beet, onions, lettuce, artichokes, cabbage, asparagus, edible mushrooms, etc. In addition, these salts also have the other properties required of active substances for food preservatives, i.e. in the concentration necessary to preserve foodstuffs they are non-toxic to warm-blooded animals and they have no adverse effect on the taste and smell of the foodstuff. The salts are practically neutral compounds and they do not alter the pH of the substrate.

The preserving agents according to the present invention are applied in an amount of from about 0.005 to about 2.0, preferably about 0.01 to about 0.5 milligrams per square centimeter of the surface of the fruit, plant or plant part to be treated.

The fungitoxic action of the new salts was determined by the so-called "spore germination test" on Penicillium spec., Penicillium digitatum, Penicillium italicum and Penicillium cyclopium.

For instance, one milliliter of a 1%, and in another test, a 0.5% solution of the compound of the formula

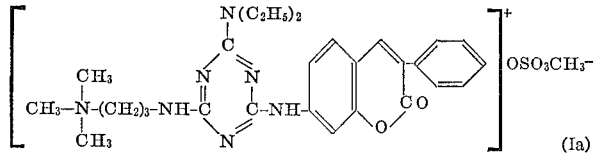

was placed on 2 glass slides (26 x 76 mm.) under the same conditions. The solvent was evaporated off and a uniform coating of active substance was obtained on the glass slides. The slides were inoculated with spores of Penicillium strain and then kept in dishes at room temperature in an atmosphere which was almost saturated with steam. The germinated spores were counted after 24 hours, and the results were summarized in the following table.

TABLE

| Compound | Concentration, g. per 100 ml. solution | Penicillium strain | | | |
|---|---|---|---|---|---|
| | | Spec. | digitatum | italicum | cyclopium |
| Quaternary compound of Formula Ia. | In ethanol: 0.5% | xxx | xxx | xxx | xxx |
| | 1.0% | xxx | xxx | xxx | xxx |
| Unquaternized compound corresponding to that of Formula I. | In acetone: 0.5% | | x | | |
| | 1.0% | x | x | xx | x | xxx=100% growth inhibition; xx=50% growth inhibition; x=10% growth inhibition.

Fruit and other edible parts of plants as well as other foods are preserved according to the invention by providing them with a protective coating of the new compound by either dipping, spraying, washing or painting them with liquid or waxy preparations containing a Penicillium growth-inhibiting amount of active substances. In many cases, because of their advantageous solubility in water, the new food-protecting salts can be used in the form of aqueous solutions. On the other hand, it is possible to mix the active substances together with suitable non-injurious dispersing agents such as vegetable oils, fats or waxes and to use these dispersible preparations as aqueous or anhydrous dispersions.

Solvents suitable for use in such dispersions are non-toxic, low boiling, organic solvents such as low-molecular hydrocarbons, such as pentane, hexane, ketones, alcohols and ethers, such as methoxy-ethanol or ethoxy-ethanol.

It is of particular advantage in this aspect of the invention that the new compounds have strong blue fluorescence when irradiated with ultraviolet light. Due to this fact, it is easy to control whether application of the preserving agent, for instance on fruit such as apples, pears oranges and the like has been uniform by passing the treated fruit on a conveyor belt or the like under an ultraviolet lamp. Insufficiently treated fruit can thus be detected instantaneously and removed for renewed treatment.

The invention further provides compositions for the inhibition of Penicillium growth, and especially for the treatment of food, which contain as active ingredient a compound falling under the first aspect of the invention in a Penicillium growth-inhibiting amount and a non-toxic, edible carrier therefor.

A paste, a pulverulent concentrate, an emulsion concentrate and a wax are described below; where not expressly stated, parts and percentages are by weight. Temperatures are given in degrees centigrade.

PASTE 20 parts of the compound of Formula Ia
20 parts of a 1% aqueous hydroxyethyl cellulose solution
3 parts of ditertiary acetylene glycol
57 parts of distilled water are milled and homogenised in a mixer into a thinly flowing 20% paste. On direct addition to water, the paste forms a milky dispersion. Freshly harvested oranges are dipped into a 1% dispersion and allowed to drip dry. About 0.01 to 0.1 mg. of active substances remained on the fruit per cm.$^2$ surface. It was observed that the fruit showed no damage whatever due to micro-organisms after several days.

PULVERULENT CONCENTRATE 95 parts of the compound of Formula Ia and 5 parts of a condensation product of nonylphenol and ethylene oxide (molar ratio 1:9 to 1:10) or another suitable, preferably non-ionic, wetting agent are homogenised and finely milled in a suitable mill. This pulverulent concentrate is not dusty and quickly dissolves in water. A suspension, in 1% concentration, evenly wets fruit treated therewith.

EMULSION CONCENTRATE 10 parts of the compound of Formula Ia
15 parts of ethoxyethanol
15 parts of dimethyl formamide
10 parts of emulsifying agent consisting of a mixture of calcium dodecylbenzene sulphonate and the condensation product of nonylphenol and ethylene oxide (molar ratio about 1:8 to 1:10)
50 parts of petroleum (boiling range 230–270°).

This mixture is a 10% emulsion concentrate which can be diluted with water to form emulsions of any concentration desired.

A 1% aqueous emulsion is used for the treatment of mould (e.g. *Penicillium italicum*) on grapefruit. For this purpose, the fruit is dipped in the emulsion and left there for a few seconds. It is then allowed to drip dry. About 0.01 to 0.1 mg. of active substance remains on the fruit per cm.$^2$ surface. The emulsion can also be sprayed on to the grapefruit or the latter can be washed therewith or can be applied thereto with a brush. The attack by Penicillium is greatly reduced by this treatment and any new infection is prevented.

PARAFFIN BLOCKS 890 parts of melted soft paraffin (M.P. 41–43°) are mixed with 100 parts of paraffin oil at about 60°, and 10 parts of very finely ground (average particle size 20–50 microns) compound of Formula Ia are worked in until a homogeneous substance is obtained, which is poured into forms and then allowed to harden.

The resulting blocks are then used in a molten state in suitable apparatus, with slight heating, to coat citrus fruit with a thin film of the compound of Formula Ia sulfate in paraffin and thus protect them against spoilage. This apparatus may wax the surface of the citrus fruit e.g. by a rubbing action.

The consistency of the blocks can be varied as desired by increasing the amount of paraffin oil and also optionally adding surfactants such as sorbitan fatty acid esters, e.g. sorbitan-sesquioleate, sorbitan-monooleate, sorbitan-trioleate, polyoxyethylene-sorbitan fatty acid esters, to obtain an increasingly softer block, thus adjusting the consistency to the requirements of the particular coating apparatus used.

PARAFFIN EMULSION 440 parts of soft paraffin (M.P. 41–43°), 220 parts of paraffin oil, and 50 parts of Arlacel 83 (sorbitan-sesquioleate) are melted together while stirring at 50–60°. A hot solution (80°) of 300 parts of distilled a water and 10 parts of the compound of Formula Ia is stirred into the melt, which is still warm (50°), with a suitable stirring apparatus (e.g. a Homorex-mixer) until a homogeneous substance is obtained.

The resulting water-in-oil emulsion is stirred while allowing to cool to about 30°. A creamy substance of soft consistency is obtained, which can be applied in suitable apparatus, e.g. by brushing, or lightly rubbing the peel of citrus fruit.

The concentration of active substance in the composition can also be varied (e.g. 0.5% or 1.5%). In lieu of Arlacel 83, other paraffin emulsifying agents, e.g. mixtures of Span 80 and 85 (sorbitan-monooleate and sorbitan trioleate) can be used as well as other inert substances suitable for preparing similar water-in-oil emulsions of end products having optimal consistency, whereby the consistency can be adapted to the requirements of the particular apparatus used for wax-coating the citrus fruit.

The term "edible parts of plants" as used in this specification and the appended claims refers to edible blossoms, seeds, fruit, leaves, sprouts, roots bulbs and/or tubers of plants.

The invention further provides, according to another aspect thereof, a method of using the novel quaternary compounds for the brightening of cellulose fibers, and particularly of polyacrylonitrile fibers.

Polymeric or copolymeric acrylonitrile substrates are treated in the usual way from an acid aqueous bath at a raised temperature. The polyacrylonitrile can also be treated in a swollen condition such as occurs in the production of polyacrylonitrile filaments in an aqueous precipitation bath, with aqueous solutions of optical brighteners according to the invention. The amount of optical brightener used in these solutions is 0.01 to 0.5% of the weight of the fibers. The goods-to-bath ratio in exhaustion brightening is preferably in the range of about 1:20 to 1:50.

Polymeric or copolymeric acrylonitrile fiber materials which are particularly suitable for brightening with the compounds according to the invention are especially fibers about 80 to 100% of which consist of polymeric acrylonitrile and which contain acid dyesites, more particularly sulfonic acid and/or carboxylic acid dyesites.

Polyacrylonitrile fibers used in the examples given, infra, are (a) Fibers which have a polymerization number of about 35,000 and possess per 100 g. of fibers about 46 millimols of sulfonic acid groups and 17 millimols of carboxyl groups as dyesites, referred to hereinafter as Orlon type fibers; or (b) Fibers having the same polymerization number and, per 100 g. of fibers, about 154 millimols of carboxylic acid groups as dyesites, referred to hereinafter as Courtelle type fibers.

It is a particularly unexpected advantage of the compounds according to the invention that brilliant neutral white shades free from greening or yellowing discolorations are produced on these acrylic fibers even when the compounds are applied in high concentrations, namely 0.2 to 0.3% calculated on the weight of the fibers, while using a goods-to-bath ratio of about 1:30 to 1:40.

For it is well known, e.g. from the article by J. Lanther on "Prüfung und Bewertung von optischen Aufhellern" published in June 1964 in "Fachorgan für Textilveredlung" by Schweizerische Vereinigung von Färbereifachleuten, XIX, No. 6, page 469, that the optical brightening of white substrates, which always possess a natural yellowish hue, to a neutral white aspect is achieved with very small amounts of blue-fluorescent optical brightener, in the order of 0.001%, and that, with increasing brightener concentration initially more and more brilliant white effects are achieved, but only until an optimal value is reached. Upon further increase of the brightener concentration, no further improvement of the white effect is achieved, but on the contrary, a decrease in white effect and an increasingly yellowish or greenish discoloration effect are noted.

This is true particularly for the known tertiary compounds from which the new quaternary salts are formed, when such tertiary compounds are used in concentrations above 0.1% of the weight of the treated fiber material.

The brightened polyacrylonitrile material of the Courtelle and Orlon type obtained with the compounds according to the invention is distinguished by very good light-fastness, wash-fastness, transparency, ironing fastness, a pure blue-fluorescent white effect free from undesirable reddish or greenish tinges, and, especially on Orlon-type fibers, excellent fastness to chlorite bleaches.

Another advantage of the new compounds lies in their lack of sensitivity to rhodanide ions. Such sensitivity is of great importance when polyacrylonitrile is to be spun into filaments by the so-called "rhodanide" wet spinning process, in which the conventional optical brighteners, when added to the aqueous precipitation bath, tend to precipitate as the number of rhodanide ions in this precipitation bath increases.

When optical brighteners according to the invention are added to such bath they are not precipitated and the brightening effect is not lost in the finishing process.

The quaternished compounds according to the invention are produced by reacting a compound of the formula

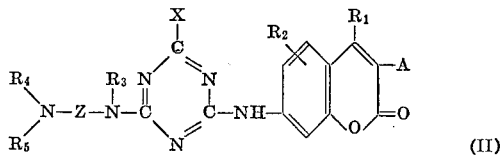

with a compound of the formula $$R_6—Y \qquad (III)$$

preferably at elevated temperature; the symbols A, $R_1$ through $R_6$, X, Z and Y in Formulas II and III have the same meanings as in Formula I.

The starting materials for the coumarin derivatives of Formula II used in the above process most of which are known, can be readily produced by the methods described in French Pat. No. 1,209,964.

The reaction of a coumarin compound of Formula II with a compound of Formula III is prefarably performed in a solvent which is inert to the reaction partners. Examples of such solvents are aromatic hydrocarbons such as benzene, toluene and xylene; halogenated hydrocarbons such as methylene chloride, tetrachloroethylene, chlorobenzene, bromobenzene or dichlorobenzene, also nitrobenzene, low alkanols and open and cyclic ethers such as ethanol, isopropanol, butanol, diethyl ether, dibutyl ether, ethylene glycol monomethyl ether, ethylene glycol monoethyl ether, tetrahydrofuran or dioxane; low ketones such as acetone or methylethyl ketone; fatty acid amides such as dimethyl formamide or dimethyl acetamide; sulphoxides such as dimethyl sulphoxide, and ureas such as tetramethyl urea.

If desired, the quaternary salts formed can be converted into other salts by double decomposition reaction.

The invention is further illustrated by the following non-limitative examples in which all temperatures are in degrees centigrade and all percentages are by weight.

EXAMPLE 1

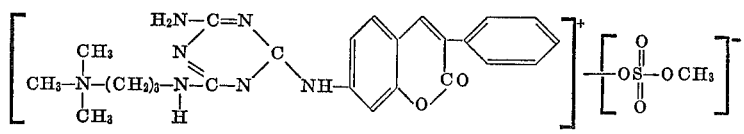

43.1 g. of 3-phenyl-7-[2-amino-4-(3-dimethylaminopropylamino)-s-triazinyl-(6)-amino]-coumarin are dissolved in 1000 ml. of anhydrous dioxane and, at 95–100°, 16 g. of neutral dimethyl sulphate are added. The quatenary salt of the above formula then begins to separate out as a yellow oil which gradually crystallises. The mixture is stirred for another 40 minutes at 100–105°, then cooled. The methosulphate formed is filtered off the product is washed well with ether and then dried in vacuo at 80°. The pale yellow crystals, which melt at 270° with decomposition, completely dissolve in water. The product also dissolves well in methanol and ethanol. The solutions fluoresce an intensive blue colour in daylight.

Its toxicity to warm-blooded animals is very low ($DL_{50}$ for rats above 500 mg./kg. bodyweight).

In vitro tests have shown that the ethanolic solution of the final product in a concentration of 0.5 g. per 100 ml. completely inhibits the growth of Penicillium strains, while the unquaternized starting compound, which must be applied in acetonic solution, fails to achieve satisfactory growth-inhibition even when used in a concentration of 1 g. in 100 ml.

The starting material used in this example, 3-phenyl-7 - [2 - amino - 4 - (3 - dimethylamino - propylamino) - s - triazinyl - (6) - amino] - coumarin, M.P. 215–217°, is produced from 3 - phenyl - 7 - [2 - amino - 4 - chloro- 1,3,5 - triazinyl - (6) - amino] - coumarin by reaction with excess N,N - dimethyl - propylenediamine.

Example 2

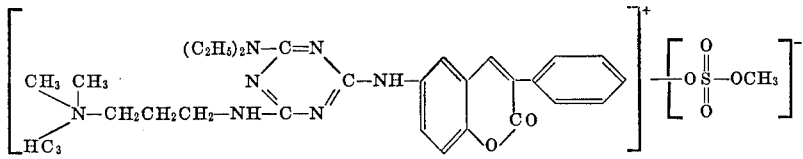

125 g. of 3 - phenyl - 7 - [2 - diethylamino - 4 - (3-dimethylamino - propylamino) - s - triazinyl - (6)-amino] - coumarin are dissolved by heating in 1000 ml. of chlorobenzene, 40 g. of neutral dimethyl sulphate are added while stirring at 90–95° and the mixture is kept for another 20 minutes at 90–95°. The reaction product separates out as a yellowish, heavy oil which solidifies on cooling into a viscous mass. The chlorobenzene solution is decanted, another 1000 ml. of fresh chlorobenzene are added, the whole is again heated to 90–95°, stirred well and the chlorobenzene phase, which is colourless for all practical purposes, is again decanted. The crude methosulphate remaining in the reaction vessel is dried in vacuo at 80–85°. A yellow, water soluble powder is obtained which has properties similar to the methosulphate obtained according to Example 1. The melting point is between 140–150°. On boiling up with methylethyl ketone, a more crystalline product which melts at 148–150° is obtained.

The 3 - phenyl - 7 - [2 - dimethylamino - 4 - (3-dimethylaminopropylamino) - s - triazinyl - (6) - amino]-coumarin, M.P. 130° (from ligroin, used as starting material in this example is produced in the usual way from 3 - phenyl - 7 - aminocoumarin, cyanuric chloride, diethylamine and N,N - dimethylpropylenediamine.

The compounds which fall under the formula

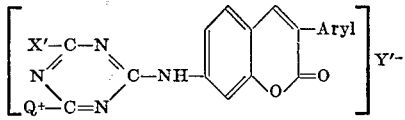

and the substituents of which are listed in the respective columns of the following table can be produced analogously. They are similarly useful for the optical brightening of polyacrylonitrile fibers, and for inhibiting the growth of Penicillium strains.

| Ex. | X' | Q⊕ | Aryl | Y'⊖ |
|---|---|---|---|---|
| 3 | (C₂H₅)₂N— | (CH₃)₂N⊕(CH₃)—CH₂CH₂NH— | Phenyl | CH₃SO₄⊖ |
| 4 | morpholino-N— | (CH₃)₂N⊕(CH₃)—CH₂CH₂CH₂NH— | do | Same as above. |
| 5 | (C₂H₅)₂N— | CH₃—N⊕(piperazinyl)—N(CH₃)— | do | Do. |
| 6 | Same as above | HOCH₂CH₂N⊕(CH₃)(piperazinyl)N— | do | Do. |
| 7 | H₂N— | morpholinyl-N⊕(CH₃)—CH₂CH₂CH₂NH— | do | Do. |
| 8 | C₂H₅NH— | (CH₃)(CH₂C₆H₅)N⊕(CH₃)—CH₂CH₂NH | do | Cl⊖ |
| 9 | CH₃NH— | (CH₃)₂N⊕(CH₃)—CH₂CH₂NH— | do | CH₃—C₆H₄—SO₃⊖ |
| 10 | CH₃O— | (CH₃)₂N⊕(CH₃)—CH₂CH₂CH₂NH— | do | CH₃SO₄⊖ |
| 11 | CH₃— | Same as above | do | Do. |
| 12 | CH₃OCH₂CH₂NH— | do | 2-chlorophenyl | Do. |
| 13 | piperidino-N— | do | 3,4-dichlorophenyl | Do. |
| 14 | HOCH₂CH₂NH— | (CH₃)N⊕(piperidino)—CH₂CH₂CH₂NH— | 4-methylphenyl | Br⊖ |
| 15 | H₂N— | (CH₃)(CH₂CH₂CH₂OOCCH₃)N⊕(CH₃)—CH₃CH₂CH₂NH— | Phenyl | Cl⊖ |

| # | Q⊕ | Aryl | Y'⊖ |
|---|---|---|---|
| 16 | H₂N— | (CH₃)₂N⁺(CH₂CONH₂)—CH₂CH₂CH₂NH— | ...do... | Cl⊖ |
| 17 | (C₂H₅)₂N— | (CH₃)₂N⁺(CH₂CH₂CN)—CH₂CH₂NH— | ...do... | Cl⊖ |
| 18 | Same as above | (CH₃)₂N⁺(CH₂CH₂OCH₃)—CH₂CH₂NH | ...do... | Br⊖ |
| 19 | CH₂=CH—CH₂NH— | (CH₃)₃N⁺—CH₂CH₂NH— | ...do... | CH₃SO₄⊖ |
| 20 | CNCH₂CH₂N(CH₃)— | (CH₃)₃N⁺—CH₂CH₂CH₂NH— | ...do... | Same as above. |
| 21 | (CH₂=CH—CH₂)₂N— | (CH₃)₃N⁺—CH₂CH₂NH— | ...do... | Do. |
| 22 | (CHCH₂CH₂)(CNCH₂CH₂)N— | Same as above | ...do... | Do. |
| 23 | (CH₃OCH₂CH₂)₂N— | ...do... | ...do... | Do. |
| 24 | (HOCH₂CH₂)₂N— | ...do... | ...do... | Do. |
| 25 | C₆H₅—NH— | ...do... | ...do... | Do. |
| 26 | (3-CH₃, 4-CH₃-C₆H₃)—NH— | (CH₃)₂N⁺(CH₃)—CH₂CH₂NH | do... | Do. |
| 27 | (Cl-C₆H₄)—NH— | Same as above | ...do... | Do. |
| 28 | (OCH₃-C₆H₄)—NH— | ...do... | ...do... | Do. |
| 29 | (piperidinyl with HOCH₂CH₂ on N)—CH—N— | ...do... | ...do... | Do. |
| 30 | CH₃S— | (CH₃)₃N⁺—(CH₂)₃—NH— | ...do... | Do. |
| 31 | H₂N— | (CH₃)₂N⁺(C₂H₅)—CH₂—CH₂—N(CH₃)— | ...do... | C₂H₅SO₄⁻ |
| 32 | CH₃—CH(OH)—CH₂—NH— | (HO—CH₂CH₂)₂N⁺(CH₃)₂—CH₂—CH₂—N(CH₂CH₂OH)— | ...do... | Cl⁻ |

| Ex. | X' | Q⊕ | Aryl | Y'⊖ |
|---|---|---|---|---|
| 33 | (CH₃)₂N– | piperidinium-N-CH₂-CH₂-CH₂-NH, with CH(CH₃)₂ on ring N | 4-chlorophenyl | Br⁻ |
| 34 | azetidinyl-N– | (CH₃)₃N⊕–CH(CH₃)–CH₂–NH– with CH₃ | 3-bromophenyl | Br⁻ |
| 35 | piperidinyl-N– | (CH₃)₃N⊕–CH₂CH₂CH₂–NH– | 3-chloro-4-methylphenyl | CH₃SO₄⁻ |
| 36 | 2,6-dimethylmorpholinyl-N– | CH₃(C₂H₅)N⊕–CH₂CH₂–NH– with CH₃ | Phenyl | Cl⁻ |
| 37 | 2-methylmorpholinyl-N– | (CH₃)₃N⊕–CH₂–CH₂–CH₂–NH– | ...do... | CH₃–C₆H₄–SO₃⁻ |
| 38 | H₂N– | (CH₃)₃N⊕–CH₂CH₂CH₂–NH– | 4-fluorophenyl | Br⁻ |
| 39 | C₃H₇–NH– | HO–(CH₂)₃–N⊕(CH₃)(CH₂CH₂)–CH₂–NH– | 2-methylphenyl | Cl⁻ |
| 40 | (C₃H₇)₂N– | CH₃–C₆H₄–CH₂–N⊕(CH₃)₂–CH₂CH₂–NH– | 3-methylphenyl | Cl⁻ |
| 41 | C₆H₁₃–NH– | C₆H₁₃–N⊕(CH₃)₂–CH₂CH₂–NH– | 3-chlorophenyl | Cl⁻ |
| 42 | C₃H₇O– | CH₃O–(CH₂)₃–N⊕(CH₃)₂–CH₂CH₂NH– | 2,4-dichlorophenyl | Br⁻ |
| 43 | C₄H₉NH– | Cl–C₆H₄–CH₂–N⊕(CH₃)₂–CH₂CH₂NH– | 2,4-dimethylphenyl | Cl⁻ |
| 44 | (CH₃–CH(OH)–CH₂)₂N– | CH₃–C₆H₄–N⊕(CH₃)₂–CH₂CH₂NH– | 3,4-dimethylphenyl | Br⁻ |
| 45 | C₂H₅S– | (CH₃)₃N⊕–CH₂–CH₂–CH₂–NH– | Phenyl | CH₃–SO₄⁻ |
| 46 | (CH₃)₂CH–O– | Same as above | ...do... | Same as above. |
| 47 | C₂H₅– | ...do... | ...do... | Do. |
| 48 | C₂H₅O– | CH₃(C₂H₅)₂N⊕–CH₂CH₂–NH– | ...do... | Do. |
| 49 | NH₂–CO–CH₂–N(CH₃)– | Same as above | ...do... | Do. |
| 50 | C₂H₅–OCH₂CH₂–NH– | ...do... | ...do... | Do. |
| 51 | HO–(CH₂)₃–NH– | ...do... | ...do... | Do. |

| Ex. | X' | Q⊕ | Aryl | Y'⊖ |
|---|---|---|---|---|
| 52 | CH₃O(CH₂)NH— | CH₃—N⁺(CH₃)(CH₃)—CH₂CH₂CH₂—NH— | do | Do. |
| 53 | HO—CH₂CH₂—O\|CH₂CH₂—NH— | Same as above | do | Do. |
| 54 | HOCH₂CH₂\N—CH₃ | do | do | Do. |
| 55 | NH₂COCH₂—NH— | do | do | Do. |

EXAMPLE 56

The compound of the formula

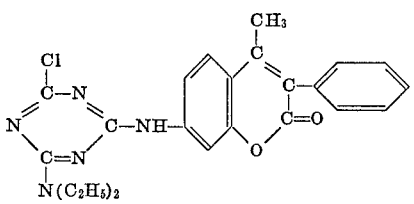

is produced by repeating Example 3 of U.S. Pat. 2,945,033 but using in lieu of 7-amine-3-phenyl-coumarin 25.1 parts of 7-amino-4-methyl-3-phenyl-coumarin obtained according to Example 20 of U.S. Pat. 3,322,794.

The above compound is then first reacted with N,N-dimethylpropylenediamine and then quaternized as described in Example 2, supra.

The optical brightener of the formula

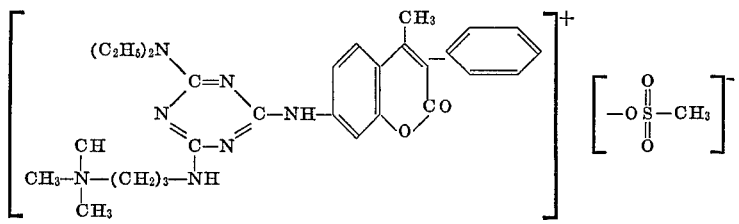

is obtained.

Polyacrylonitrile fibers optically brightened with this compound show a more reddish violet hue than fibers brightened with the compound of Example 1.

EXAMPLE 57

The compound of the formula

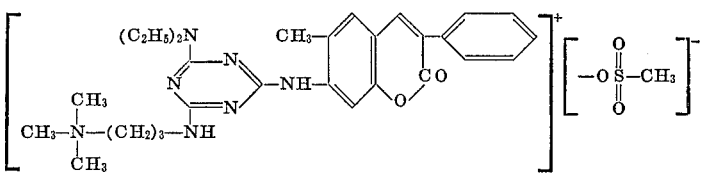

which brightens polyacrylonitrile fibers a brilliant neutral white, is obtained by repeating Example 56, but using in lieu of 7-amino-4-methyl-3-phenylcoumarin an identical amount of 7-amino-6-methyl-3-phenyl-coumarin obtained as described in Example 1 of U.S. Pat. 3,322,794, but using in lieu of 3-aminophenol an equivalent amount of 3-amino-4-methyl-phenol.

EXAMPLE 58

20 g. of polyacrylonitrile yarn (of Orlon type fibers) are introduced into a 50° warm liquor which contains 0.01 g. of the optical brightener described in Example 2 and 1 g. of formic acid in 600 ml. of water. The temperature is raised within 15 minutes to 96–98° and the liquor is kept for 30 minutes at this temperature. The yarn is then rinsed, first with lukewarm and then with cold water, and dried. The material so treated has a beautiful white effect in daylight.

Similar brightening effects are obtained if, in the above example, 1 g. of formic acid is replaced by 2.4 g. of concentrated hydrochloric acid or by 0.6 g. of concentrated hydrochloric acid or by 0.6 of concentrated sulphuric acid.

EXAMPLE 59

20 g. of polyacrylonitrile yarn (of Courtelle type fibers) are first rinsed at a temperature of 60° in 600 ml. of water containing 0.6 g. of a non-ionic washing agent of nonylphenol polyglycol ether with 8–15 ethyleneoxy groups per mole and 0.3 g. of acetic acid. The yarn is then introduced into a 60° hot liquor which contains 0.08 g. of the optical brightener described in Example 1, 0.6 g. of oxalic acid, 0.075 g. of sodium metabisulphite and 0.15 g. of a mixture of sodium tetra- and soduim hexa-metaphosphate. The temperature of the liquor is raised to 96–98° within 20 minutes and kept at this temperature for another 30 minutes.

The yarn is then washed, first with lukewarm and then with cold water, if desired it is subjected to a further finishing process with a cationic softener of the bis-stearyl-bis-methyl ammonium chloride type, and dried.

Yarn so treated has a very beautiful white effect in daylight.

Similar brightening effects are obtained if, in the above example, the optical brightener mentioned is replaced by about the same amounts of one of the compounds given in Examples 2 to 57 and otherwise the procedure given in the example is followed.

EXAMPLE 60

A fabric made of Orlon type stable fibers is impregnated in a padding machine at 25° with a solution containing 2 g. of the optical brightener given in Example 1 in 1000 ml. of water. The fabric is dried at a temperature of 60° and then steamed for 15 minutes at 100–102°. The fabric so treated has a very strong white effect.

EXAMPLE 61

250 g. of an acrylic polymer, which is described below, is dissolved in 750 g. of N,N-dimethyl formamide containing 2.5 g. of titanium dioxide at 70° while stirring continuously and vigorously. This solution is spun through a spinneret having 500 holes (diameter 0.1 mm.) in a coagulation bath containing equal amounts of dimethyl formamide and water. The resulting filaments are stretched by 450% in boiling water and then impregnated with optical brightener by passing the filaments through an aqueous bath which contains 500 p.p.m. of the optical brightener described in Example 1 in addition to acetous N,N'-distearoylaminoethyl-N,N'-dihydroxyethyl urea. The fibres are then dried at 120° and stabilised with steam at 120°.

The acrylic polymer used in this example is produced as follows: a mixture of monomers is polymerised in a 5 litre glass reaction vessel containing 1500 ml. of $H_2SO_4$ N/1000. After adjusting the pH to 2.5, the following solutions are introduced into the reaction vessel separately and yet simultaneously, the additions being made within 2 hours at 50°.

Mixture of monomers consisting of:

90% acrylonitrile and 10% methyl acrylate—800 g.
2.5% aqueous $Na_2S_2O_5$ solution—1000 ml.
0.5% aqueous $K_2S_2O_8$ solution—1000 ml.
4% aqueous sulphuric acid solution—500 ml.

After a reaction time of 3 hours, the polymer is separated from the reaction mixture by filtration and washed with water. The copolymer having acid groups thus obtained which consists of 91% acrylonitrile and 9% methyl acrylate, has an intrinsic viscosity=1.5 deciliter/gram and contains 4 milliequivalents per 100 g. of fibers of sulfonic acid dyesites.

EXAMPLE 62

250 g. of an acrylic polymer, the production of which is described below, are dissolved in 750 g. of N,N-dimethyl formamide containing 2.5 g. of titanium dioxide while stirring at 70°. This solution is spun through a spinneret into a coagulation bath containing equal amounts of dimethyl formamide and water. The filaments so spun are stretched by 450% in boiling water and then passed through an aqueous finishing bath at a rate of about 20 g. per minute, to which bath there is added optical brightener produced according to Example 2, at a rate of 20 mg. per minute, dissolved in the 100-fold amount of water containing N,N'-distearoylaminoethyl-N,N'-dihydroxyethyl urea acetate acting as softening and mildly antistatic agent. The fibers are then dried at 120° and stabilized with steam at 120°.

The acrylic polymer used in this example is produced as follows: A mixture of monomers is polymerised in a 5 litre glass reaction vessel containing 1500 ml. of N/1000 $H_2SO_4$ by introducing the following solutions into the reaction vessel within 2 hours at 20°.

Mixture of monomers consisting of:

90% acrylonitrile and 10% methyl acrylate—800 g.
0.85% aqueous $H_2O_2$ solution—960 ml.
2.1% aqueous $Ti_2(SO_4)_3$ solution containing 3.2% $H_2SO_4$—960 ml.
1% aqueous solution of sodium vinylbenzene sulphonate—800 ml.

After a reaction time of 3 hours, 650 g. of a copolymer are obtained which consists of 91% acrylonitrile, 8% methyl acrylate and 1% vinylbenzene sulphonic acid, has an intrinsic viscosity of 1.55 deciliters per gram, and contains per 100 g. thereof, 4.8 milliequivalents of sulfonic acid groups.

We claim:

1. A method of optically brightening polyacrylonitrile fibers comprising applying to said fibers from about 0.001% to 0.5% calculated on the weight of said fibers a compound of the formula:

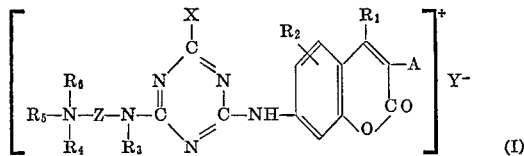

wherein

A represents an unsubstituted phenyl radical or a phenyl radical substituted with a member selected from lower alkyl, lower alkoxy and halogen of an atomic number of at most 35.
each of $R_1$ and $R_2$ represents hydrogen or lower alkyl,
$R_3$ represents hydrogen, lower alkyl, or hydroxy-lower alkyl,
each of $R_4$, $R_5$ and $R_6$ represents a substituent selected from
  (a) alkyl of from 1 to 6 carbon atoms;
  (b) a substituted lower alkyl radical wherein the substituent is selected from lower alkoxy, carbamoyl, cyano, lower alkoxy-carbonyl, hydroxy-lower alkoxy, a phenyl radical, or a phenyl radical substituted with a member selected from lower alkyl and halogen of an atomic number of at most 35;
  (c) cyclohexyl; and
  (d) lower alkyl-cyclohexyl; or

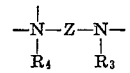

represents a trivalent piperazinium residue

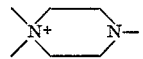

or $R_4$ and $R_5$ taken together with the nitrogen atom to which they are linked represent pyrrolidino, piperidino, morpholino, hexahydroazepino, or lower alkyl-morpholino;
X represents lower alkyl, lower alkoxy, lower alkylthio, or a grouping

wherein
  each of $R_7'$ and $R_8'$ represents hydrogen, alkyl of at most 6 carbon atoms, hydroxy-lower alkyl, hydroxy-lower alkoxy-lower alkyl, cyano-lower alkyl, carbamoyl-lower alkyl, cyclohexyl, lower-alkyl-cyclohexyl, lower alkenyl, or a phenyl amino radical or a substituted phenyl amino radical wherein the substituent is selected from lower alkyl, lower alkoxy and halogen of an atomic number of at most 35, or
  $R_7'$ and $R_8'$ together with the nitrogen atom to which they are linked represent pyrrolidino, piperidino, hexahydroazepino, morpholino or lower alkyl-morpholino,
Z represent divalent ethylene or propylene, and
Y− represents the anion of an acid having at 180° C. a degree of dissociation of about 20% or higher, and not imparting to the compound of Formula I color.

2. A method as described in claim 1, wherein said compound is of the formula

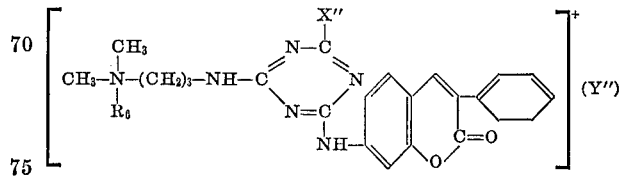

wherein $R_6$ represents methyl or carbamoylmethyl,
X" represents amino, di-(lower alkyl)-amino, methoxy or methyl, and
(Y''') represents $CH_3OSO_3^-$,

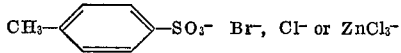

3. A method as described in claim 1, wherein in said formula, $R_6$ represents methyl and X" represents amino.

4. A method as described in claim 1, wherein in said formula, $R_6$ represents methyl and X" represents methoxy.

5. A method as described in claim 1, wherein in said formula, $R_6$ represents methyl and X" represents dimethylamino.

6. A method as described in claim 1, wherein in said formula, $R_6$ represents methyl and X" represents methyl.

7. A method as described in claim 1, wherein in said formula, $R_6$ represents carbamoylmethyl and X" represents amino.

References Cited

UNITED STATES PATENTS

| | | | |
|---|---|---|---|
| 2,945,033 | 7/1960 | Hausermann | 260—249.8 |
| 3,242,177 | 3/1966 | Schellhammer | 260—249.9 |
| 3,369,018 | 2/1968 | Di Giovanoel | 252—301.2 |

TOBIAS E. LEVOW, Primary Examiner

A. P. DEMERS, Assistant Examiner

U.S. Cl. X.R.

8—115.6; 99—222; 106—138.5; 252—8.75, 8.8, 301.21; 260—249.6, 249.8, 249.9, 247.1, 247.5, 999